(No Model.)

R. M. HUNTER.
CLEANING BRUSH FOR ELECTRIC RAILWAYS.

No. 474,472. Patented May 10, 1892.

WITNESSES:
Henry Drury
George F. Drury

INVENTOR:

ously the same position with relation to
UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

CLEANING-BRUSH FOR ELECTRIC RAILWAYS.

SPECIFICATION forming part of Letters Patent No. 474,472, dated May 10, 1892.

Original application filed March 18, 1886, Serial No. 195,742. Divided and this application filed February 8, 1889. Serial No. 299,100. (No model.)

*To all whom it may concern:*

Be it known that I, RUDOLPH M. HUNTER, of the city and county of Philadelphia, and State of Pennsylvania, have invented an Improvement in Cleaning-Brushes for Electric Railways, (Case No. 83,) of which the following is a specification.

My invention has reference to electric railways; and it consists of certain improvements which are fully set forth in the following specification and shown in the accompanying drawings, which form part thereof.

This application (Case No. 83) is a division of my application, Serial No. 195,742, filed March 18, 1886, and has particular reference to conduit railways.

The object of my invention is to provide the electrically-propelled vehicle or car with a depending holder or shank entering the slot of the conduit and provided with a brush substantially fitting said conduit, whereby as the vehicle moves along any dirt may be swept through the conduit until it falls into a well, from which it may be extracted. By this means the conduit may be kept perfectly clean and loss from leakage, due to dirty and moist conduits, largely overcome.

My improvement also contemplates sweeping the working conductors within the conduit to keep them clean and prevent accumulations of dirt, &c., which might ground the conductors or tend to form short circuits.

In carrying out my invention I suspend from the vehicle below or substantially in line with one of the axles a shank made flat and carrying on its lower end a brush. The vehicle may be constructed in any suitable manner, and the conduit may be located in any convenient position below the vehicle and provided with one or more longitudinal working conductors insulated from it.

Figure 1:
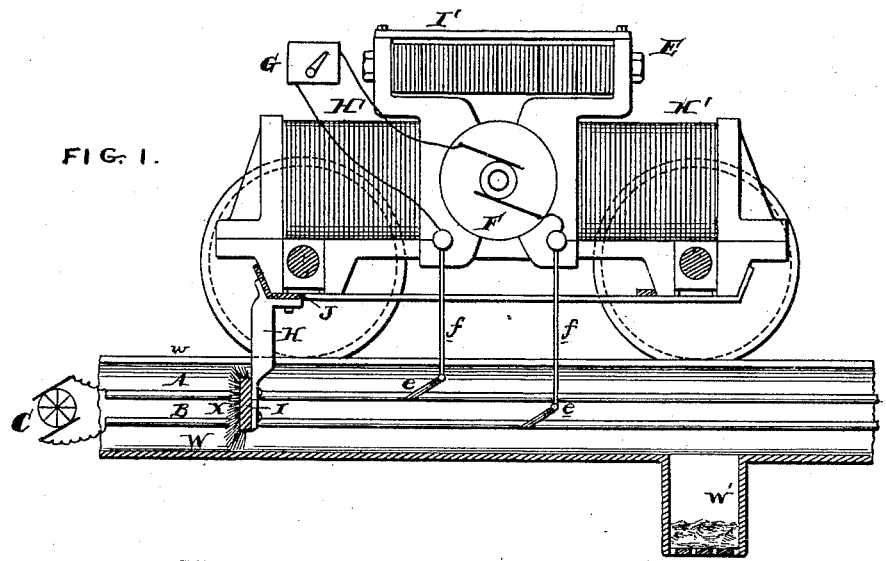
Figure 4:
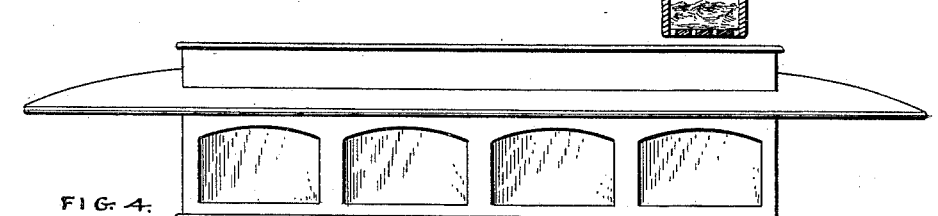
Figure 2:
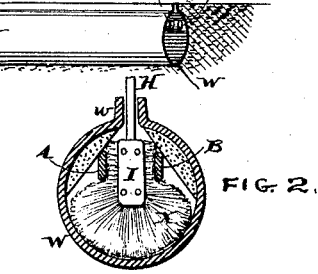
Figure 3:

In the drawings, Figure 1 is a sectional elevation of an electrically-propelled vehicle and road-bed embodying my invention. Fig. 2 is a cross-section of the conduit and the brush or broom in position in the conduit. Fig. 3 is a perspective view of the brush or broom. Fig. 4 is a side elevation of an electric railway embodying my invention, and Fig. 5 is a diagram showing arrangement of the line and working conductors.

Figure 5:
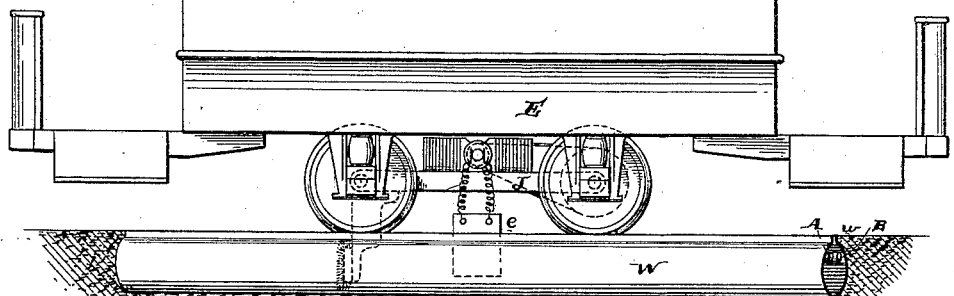
Figure 5:
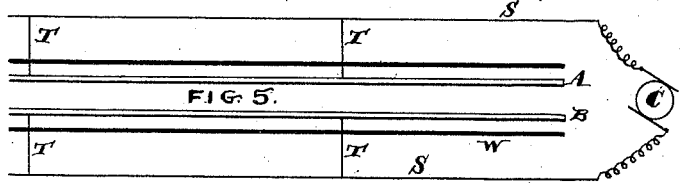

A and B are two working conductors within a slotted conduit W, and receive current from a generator C directly or through line-conductors S S and branch conductors T T, Fig. 5. The conduit may be provided at intervals apart with wells W', preferably having perforated bottoms, through which the drainage-water may pass. These wells may open to the street for cleaning purposes. The conduit may be of any construction.

E is an electrically-propelled vehicle of any suitable description. In Fig. 1 it is simply shown as a large motor, while in Fig. 3 the ordinary form of a horse-car is shown. The motor may be of any description desired, as may also the collectors *e e* for supplying current to the motor from the conductors A B in the conduit.

The vehicle is provided with a frame J, supported on the axles and preferably independent of the car-body. Secured to this frame in any convenient manner is the brush-shank H, which is made flat, so as to extend down through the narrow slot *w* of the conduit, and at the same time gives strength. This shank is preferably formed of iron.

X is the brush or broom and is secured to the shank H. The brush is shown in Figs. 2 and 3 and is adapted to sweep the conductors A and B, as well as the bottom of the conduit. I do not limit myself to any form of brush nor to any particular manner of supporting it. As shown, it is located below or substantially below the axle of the vehicle and positively or rigidly carried forward with it, its location being such that it maintains practically the same position with relation to the wheels in going around curves. The brush or broom sweeps the working conductor A B, but not the line or supply conductors S S, as these latter are not exposed in the conduit, but would be suspended or buried and well insulated.

Having now described my invention, what I claim as new, and desire to secure by Letters Patent, is—

1. The combination, with an electric locomotive, of slotted conduit beneath the surface of the street or roadway, an insulated electric conductor therein carrying the supply of electricity, a constant electric connection between the locomotive and said conductor, and a broom carried by said locomotive and extending into said conduit through the slot to a point opposite the said conductor and having laterally-extended portions to sweep the conductor.

2. The combination, with an electric locomotive, of a slotted conduit and an insulated electric conductor therein carrying the main current-supply and with which the locomotive has a constant connection, and a broom having a flat shank carried by the locomotive and extending into said conduit through the slot and adapted to sweep the conductor.

3. In an electric railway, a slotted conduit, a conductor within said conduit, a traveling motor, and a brush carried by said motor and extending down into the conduit, located at a point beneath the axle of the motor and rigidly connected therewith.

4. In an electric railway, a slotted conduit, a conductor within said conduit, a traveling motor, and a brush carried by said motor and extending down into the conduit, located at a point beneath the axle of the motor, the said brush consisting of a flat shank extending from the motor down through the slot into the conduit and provided on its end with a transversely-expanded brush to sweep the conductors secured to the shank.

5. In an electric railway, the combination of a slotted conduit arranged along the railway, a working conductor arranged within the conduit, an electrically-propelled vehicle provided with a contact device extending down through the slot of the conduit and making a traveling contact with the conductor, a supply-conductor extending from a source of electric supply and connected at intervals with the working conductor to supply electricity thereto, and a cleaning-brush carried by said vehicle and extending through the slot of the conduit and adapted to sweep the working conductor but not the supply-conductor.

In testimony of which invention I hereunto set my hand.

RUDOLPH M. HUNTER.

Witnesses:
ERNEST HOWARD HUNTER,
E. M. BRECKINREED.